United States Patent [19]
Foster et al.

[11] Patent Number: 5,746,603
[45] Date of Patent: May 5, 1998

[54] NARCOTICS FLASH CARDS

[76] Inventors: Kenneth C. Foster, 10130 Avella La., Richmond, Va. 23236; Darlene S. Duncan, 2037 Woodland Rd., Petersburg, Va. 23805

[21] Appl. No.: 744,585

[22] Filed: Nov. 6, 1996

[51] Int. Cl.$^6$ ............................................. G09B 19/00
[52] U.S. Cl. ........................... 434/219; 434/127; 434/433
[58] Field of Search ................................. 434/236, 127, 434/259, 219, 377, 433

[56] References Cited

U.S. PATENT DOCUMENTS

| | | | |
|---|---|---|---|
| D. 135,716 | 5/1943 | Willard . | |
| D. 334,597 | 4/1993 | Busquets . | |
| 2,959,871 | 11/1960 | Honkavaara | 434/236 |
| 3,579,862 | 5/1971 | Ballen | 434/259 |
| 4,162,581 | 7/1979 | O'Connor | 434/259 |
| 4,243,224 | 1/1981 | Spector | 434/333 |
| 4,286,952 | 9/1981 | Roche | 434/259 |
| 4,478,583 | 10/1984 | Sellers | 434/259 |
| 4,487,585 | 12/1984 | Goldwasser | 434/259 |
| 4,687,203 | 8/1987 | Spector | 273/157 R |
| 4,840,374 | 6/1989 | Skinner | 434/259 |
| 5,000,486 | 3/1991 | Rua, Jr. et al. . | |
| 5,100,326 | 3/1992 | Leep et al. | 434/129 |
| 5,139,268 | 8/1992 | Garnett . | |
| 5,244,391 | 9/1993 | Bryant . | |
| 5,312,257 | 5/1994 | Tarvin et al. | 434/219 |

*Primary Examiner*—Paul J. Hirsch
*Attorney, Agent, or Firm*—Jacobson, Price, Holman & Stern, PLLC

[57] ABSTRACT

A narcotics flash card including a card which is folded in half so as to present to the user, at least initially, a photographic image of the drug through an opening in the upper portion of the card, and a three-dimensional textured surface simulating the feel of the drug on the upper portion of the card. Upon opening of the card, a wealth of information is provided concerning a particular illegal drug by which an individual may be taught and tested on the name and properties of a particular drug based upon a viewing of a small fraction of a photograph of the illegal drug through the opening in the upper portion of the card and feeling a textured surface which simulates the actual drug. Upon opening of the flash card, the individual's suspicions as to the name and properties of the particular illegal drug will be confirmed and additional information provided or an explanation will be provided to the individual as to what the individual should have known about a particular drug. A scent patch including a synthetic chemical duplication of the smell associated with a particular drug is included in a sponge material which is sealed between airtight, paraffin based film layers and attached to the card. The scent is released by tearing or stretching the film until perforated for release of the chemically engineered smell reproducing the scent of the actual illegal drug.

20 Claims, 3 Drawing Sheets

5,746,603

NARCOTICS FLASH CARDS

FIELD OF THE INVENTION

The present invention relates to the use of a plurality of flash cards as a learning tool which includes information concerning a particular illegal narcotic or legal substances used illegally. Information is provided by text, simulated scent smell patch, and three-dimensional textured surfaces along with a photograph of the actual drug.

BACKGROUND OF THE INVENTION

The illegal or harmful use of psychoactive or addictive drugs is a major threat to all world communities and to future generations. There is a network of prevention experts and community volunteers from a wide range of professions whose mission is to help assure a healthier and safer world through drug prevention efforts. Some of the individuals who need to be experts in determining the presence or use of drugs are physicians, attorneys, educators, law enforcement officials and drug prevention and treatment specialists.

Presently, law enforcement officials occupy the front lines in the war against illegal drugs. These officials need to be trained in all aspects of various illegal drugs. Over time, this exposure is gained based upon field experience. However, there is a need for new law enforcement officials, or those with limited illegal drug exposure, to immediately recognize illegal drug substances by their appearance, their smell, their feel, and the results that these drugs have on individuals.

Oftentimes the training of new law enforcement officials, includes lectures, films, and interaction with those having a great deal of experience dealing with the fight against illegal drugs. However, once a newly trained law official is sent out to deal with real life situations, the official may be at a loss for immediate recognition of illegal drug activity due to a lack of "hands-on" experience. Accordingly, there is a need for a more in-depth training of law enforcement officials, and others, such as those involved with schools, colleges and private industry, to be immediately able to recognize an illegal drug by its appearance, feel and smell.

It is also important to know what the affects of the drug on an individual will be and the dangers involved with the use of the drug so as to recognize a medical condition as a possible result of the use of illegal drugs. In addition, one being trained to recognize illegal drugs would also need to know the various names associated with a particular drug.

SUMMARY OF THE INVENTION

Accordingly, it is an object of the present invention to meet the long felt need of making law enforcement officials and others aware of the properties, appearance, smell and effects of illegal drugs.

This object is attained by the present invention in the form of a narcotics flash card. The card is folded in half so as to present to the user, at least initially, a photographic image of the drug through an opening in the upper portion of the card. In addition, a three-dimensional textured surface simulates the feel of the drug on the upper portion of the card.

When the card is opened, a wealth of information is provided concerning a particular illegal drug. By the present invention, an individual may be tested on the name and properties of a particular drug based upon a viewing of a small fraction of a photograph of the illegal drug and feeling a textured surface which simulates the actual drug. Upon opening of the flash card, the individual's suspicions as to the name and properties of the particular illegal drug will be confirmed and additional information provided or an explanation will be provided to the individual as to what the individual should have known about a particular drug.

For example, when the narcotic flash card is opened, on the interior surface of an upper portion of the card is seen a description of the chemical processing of the drug. An explanation is provided of the terminology referred to for chemically processing the drug and the reason why the drug is chemically processed.

Then an explanation is provided of the "high" that is provided by the drug. Finally, on the interior surface of the upper portion of the card, the numerous dangers associated with a particular drug are enumerated.

On the interior surface of a lower portion of the opened flash card, a photograph is included with a picture of the drug being held in the hand of an individual. This gives the observer an accurate sense of the physical size and look of the drug. To the side of the photograph, in bold type, is the "official" name or names of the drug. In addition, a plurality of alternative names or street or slang names of the drug are included.

An important feature of the flash card of the present invention, included on the lower portion of the card, is a scent patch. A synthetic chemical duplication of the smell associated with a particular drug is included in a sponge material. The sponge material is sealed between airtight, paraffin based film layers and attached to the card. The scent is released by tearing or stretching the film until perforated for release of the chemically engineered smell reproducing the scent of the actual illegal drug.

The reproduction of the smell of an illegal drug, for example, the smell of cocaine, is produced by methyl benzoate ($C_6H_5COOCH_3$). The smell of PCP is reproduced by a mixture of cyclohexanone ($C_6H10O$), phenylacetone ($C_6H_5CH_2COCH_3$) and ethyl ether ($C_2H_5OC_2H_5$). These are examples of two illegal drugs for which a synthesized scent can be reproduced. It is understood as being within the scope of the present invention that the synthesized smell of other illegal drugs can be produced and included on a narcotic flash card of the present invention. A packet including the scented sponge and paraffin based film layers is secured to the card by glue or other adhesive means.

The simulated smell of a particular drug will enhance the awareness of the most qualified narcotics experts as well as provide an educational experience that even a novice can relate to. If a particular drug is later encountered in a real-life situation, the drug will be instantly recognizable to an individual by its smell.

A protruding edge portion of the lower portion of the flash card can be used to include identifying data with respect to key properties of a particular drug and other information which summarizes the information contained on the interior surfaces of the upper and lower portions of the card. In addition, on the exterior surface of the lower portion of the card, cautions are provided in print form to advise an individual on how to approach someone under the influence of the illegal drug simulated by smell and feel on the interior surfaces of the flash card. This information would include the state of mind of the individual under the influence of a particular drug and how they would be expected to react to the presence of a law enforcement official. In addition, it is contemplated that a toll-free number could be included to provide any additional information required after reviewing the entirety of the flash card.

Accordingly, it is another object of the present invention to provide a narcotics flash card including information concerning a particular drug and including a photograph of the drug, a textured surface simulative of the drug and a scent patch which reproduces the smell of the drug.

It is another object of the present invention to provide a narcotics flash card having an upper portion including a hole and a lower portion, with the upper portion folded over the lower portion so that the interior surface of the lower portion is viewed through the hole in the upper portion so as to display a portion of a photograph of the drug and including a textured surface on the exterior surface of the upper portion of the card for testing an individual as to the identity of a particular drug.

It is yet another object of the present invention to provide a narcotics flash card having an upper portion and a lower portion with the upper portion folded over the lower portion, and which when opened reveals interior surfaces of the upper portion and lower portion, including a detailed description of the illegal drug, the reaction produced by an individual taking the drug, the dangers associated with taking the drug, the commonly associated name of the drug, the street names of the drug, a textured patch reproducing the feel of the drug, and a scent patch, which when opened transmits the smell of the drug.

It is still yet another object of the present invention to provide a narcotics flash card which includes detailed characteristics of a particular drug for use in educational purposes, including the use of simulated feel and smell of a particular drug and including an advisory notice of how to approach an individual who has taken such a drug and including a telephone number if additional information is required concerning a particular drug.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
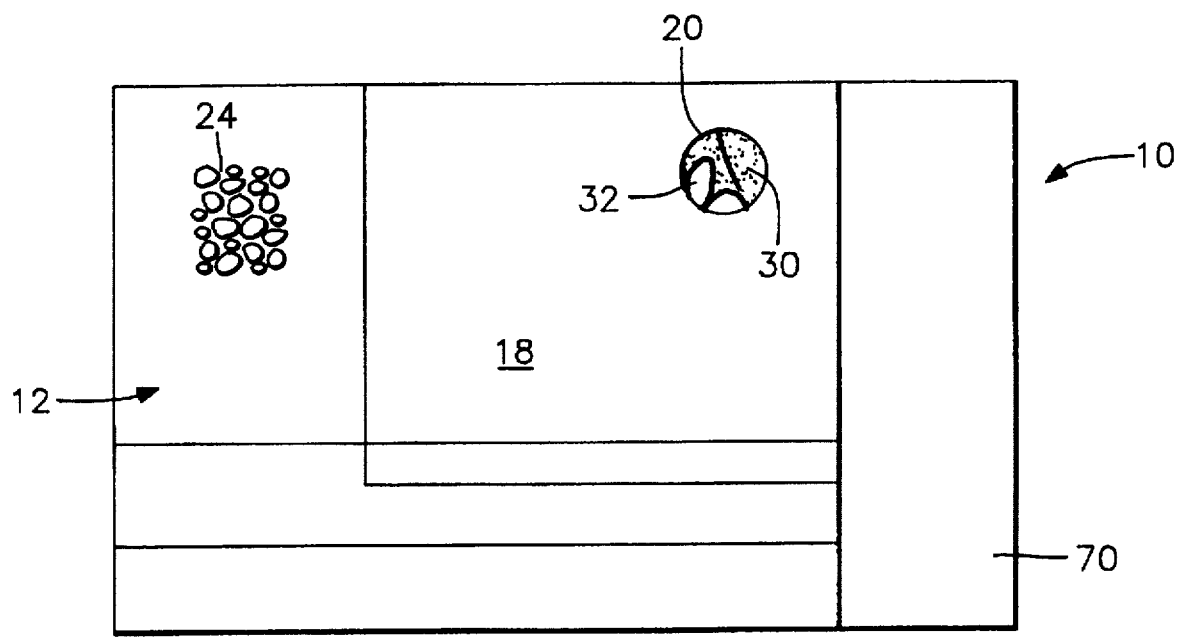
FIG. 1 is a plan view of a narcotics flash card of the present invention shown in a folded condition with an upper portion overlying a lower portion.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
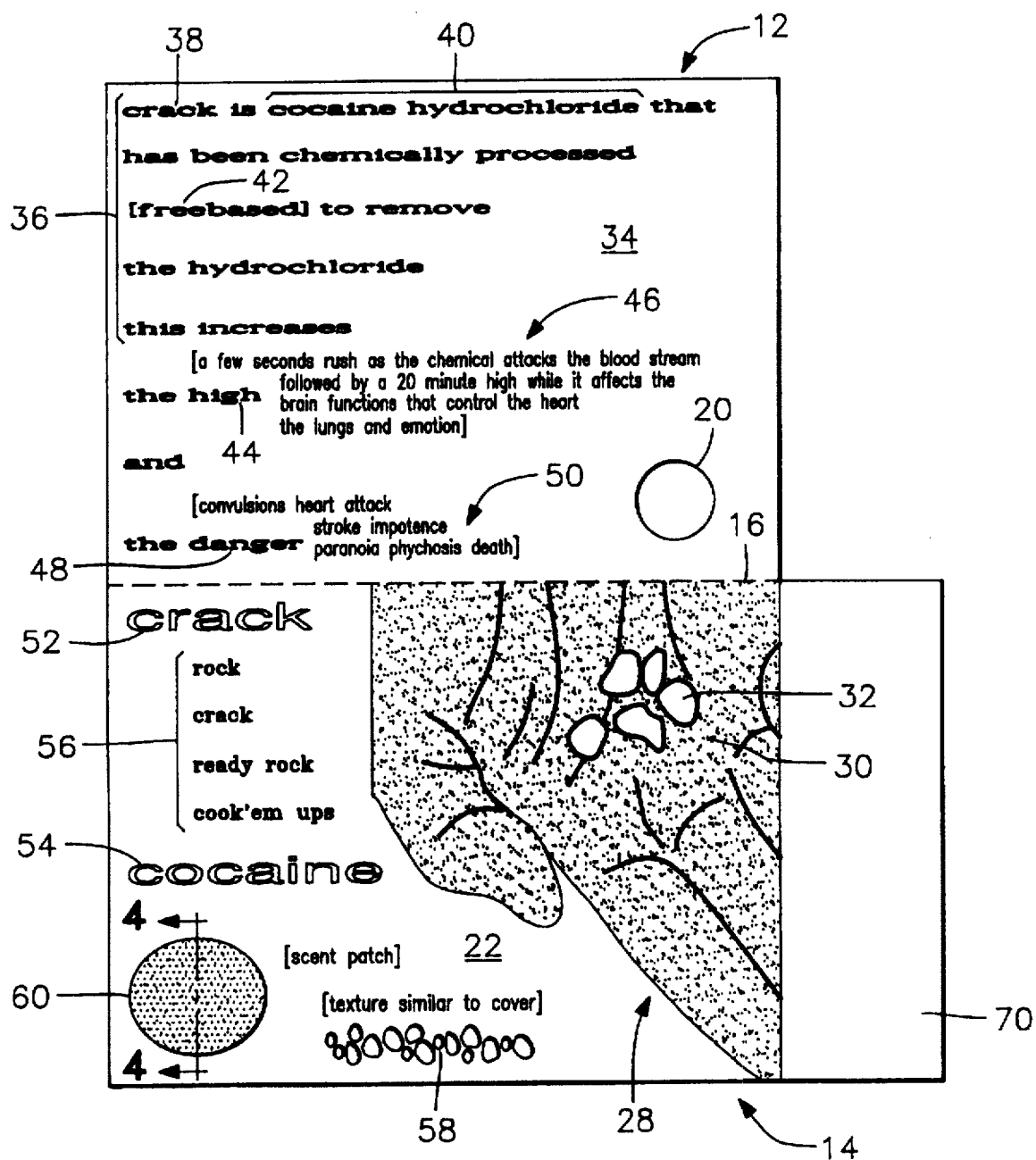
FIG. 2 is a top plan view of the narcotics flash card shown in FIG. 1 in an unfolded condition so that the interior surfaces of an upper portion and a lower portion of the card are visible.

With reference to the drawings, in general, and to FIGS. 1 and 2, in particular, a narcotics flash card embodying the teachings of the subject invention is generally designated as 10. With reference to its orientation in FIG. 1, the flash card 10 includes an upper portion 12 which, as shown in FIG. 2 is connected to a lower portion 14 by a fold line 16. The card 10 is made of heavy paper or thin cardboard material having surfaces which can be printed on.

Figure 3:
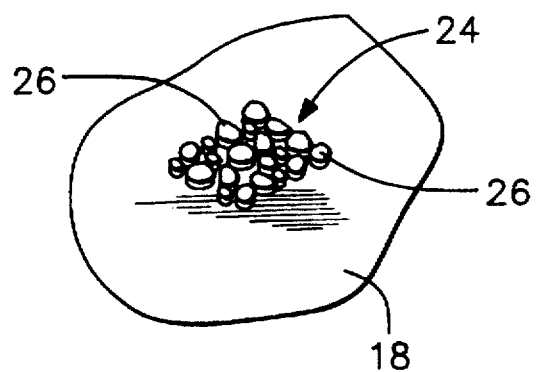
FIG. 3 is a perspective view of a portion of the flash card shown in FIG. 1, illustrative of the three-dimensional textured surface shown in FIG. 1 and included in a different arrangement on the interior surface of the lower portion of the card as shown in FIG. 2.

In FIG. 1, the upper portion 12 includes an exterior surface 18 having a cut-out hole 20 in a circular shape for viewing the interior surface 22 of lower portion 14. The exterior surface 18 of the upper portion 12, includes a raised textured area 24 to provide the feel of a drug for which a particular flash card is directed. As shown in FIG. 3, the textured area 24 includes a plurality of what appear to be rock-like clumps 26 which in this particular card provides an individual with the feel of crack cocaine. Additionally, the cut-out hole 20 provides a limited view of photograph 28 which includes a photograph of a hand 30 holding an actual sample of crack cocaine 32. Accordingly, through cut-out circle 20, the crack cocaine photograph 32 and the hand 30 are visible.

Viewing the exterior surface 18 of upper portion 12, sufficient information should be provided to an individual who is experienced in recognizing illegal drugs or legal substances used illegally, that they should recognize the particular drug shown through cut-out hole 20 and texturally identified in area 24. If the particular drug is not known to an individual by viewing exterior surface 18 of upper portion 12, the upper portion 12 is folded back away from lower portion 14 to an open position of the flash card 10 as shown in FIG. 2. In this figure, interior surface 34 of upper portion 12 and interior surface 22 of lower portion 14 are exposed.

In the open position of the card, the viewer is initially provided with indicia 36 of a drug chemical analysis of a particular drug which identifies the drug by name with indicia 38 and by its chemical composition with indicia 40. Indicia 42 provides the street name for the chemical processing of the drug.

In an area 44 of the interior surface 34 of the upper portion 12, the "high" achieved by the drug is described by indicia 46. Additionally, in area 48, the danger associated with the use of the drug is described by indicia 50.

On the interior surface 28 of lower portion 14, the common names of the drug are indicated in bold-type areas 52 and 54. Area 56 includes indicia of street or slang names of the drug. Similar to area 24 on the exterior surface 18 of upper portion 12, a texture area 58 is included on the interior surface 22 of lower portion 14.

Figure 4:
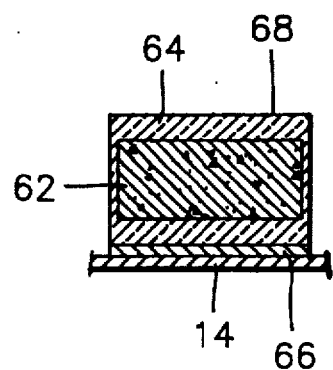
FIG. 4 is a cross-sectional view of a scent patch taken along line 4—4 as shown in FIG. 2 and including a sponge layer sandwiched between enveloping layers of paraffin-based film with the scent patch adhered to the interior surface of the lower portion of the card.

In addition, a scent patch 60 is included in a corner of the interior surface 22. The scent patch includes sponge 62, as shown in FIG. 4. The sponge 62 had been soaked in a chemical composition which simulates the smell of a particular drug. The sponge 62 is sealed in an airtight, paraffin-based film 64 which is adhered to lower portion 14 by an adhesive layer 66. Upon breakage or perforation of the uppermost surface 68 of the film 64, the scent impregnated on the sponge 62 is released. The scent is a non-harmful, chemically recreated scent of a drug identified by a particular card.

Alternatively, the patch 60 can include microcapsules, which when broken, will release the chemically created scent similar to the drug being identified. An example of the use of microcapsules to hold and release a scent is disclosed in U.S. Pat. No. 4,687,203, herein incorporated in its entirety by reference.

Interior surface 22 includes a lateral edge portion 70 which projects laterally beyond a side edge of upper portion 12. Accordingly, when the flash card of the present invention is in a folded condition as shown in FIG. 1, the edge portion 70 is exposed. This edge portion may be used to include key indicia identifying in a concise manner all of the most important information contained on the interior surfaces 34, 22 of upper portion 12 and lower portion 14, respectively.

Figure 5:
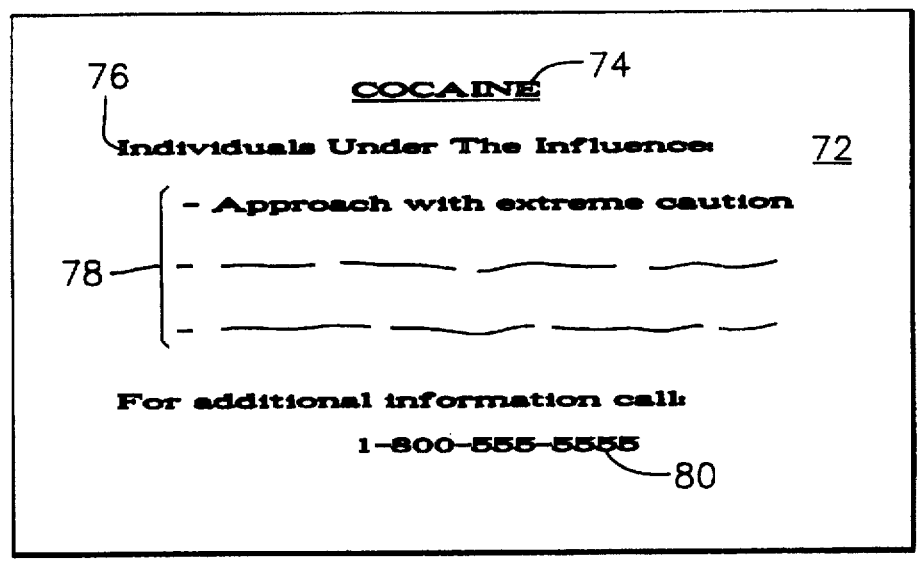
FIG. 5 illustrates an exterior surface of the lower portion of the card which includes additional information concerning the potential actions of an individual under the influence of a particular drug and a telephone number for receiving additional information concerning a particular drug.

Additional information is provided on the exterior surface 72 of lower portion 14 as shown in FIG. 5. In FIG. 5, the drug name is again indicated by indicia 74. Additional information is provided under the heading 76 which identifies the characteristics of the behavior of an individual under the influence of the drug identified on a particular card. The various behavioral patterns exhibited by a person under the influence of a particular drug is identified in area 78.

For individuals interested in obtaining additional information concerning a particular drug, a telephone number 80 is provided.

By the present invention, a plurality of flash cards each having the same identifies and indicators as the flash card 10 shown in FIGS. 1 through 5, would be provided for a plurality of illegal narcotics and legal substances used illegally. This information is extremely helpful in training individuals who in view of their position, either need or want to know the particular characteristics of a drug prior to actually encountering the drug. The simulated smell, feel and appearance of the drug replicated in the flash card of the present invention is an important tool to educate individuals of the forms and dangers of drugs.

Having described the invention, many modifications thereto will become apparent to those skilled in the art to which it pertains without deviation from the spirit of the invention as defined by the scope of the appended claims.

We claim:

1. An educational device for training an individual to recognize a particular illegal narcotic or legal substance used illegally, said device comprising:

a card, a textured area of said card simulative of the feel of a particular drug, a scent patch on said card containing a simulated smell of the particular drug, and indicia on said card describing the particular drug.

2. An educational device according to claim 1, wherein said card includes an upper portion and a lower portion, said upper portion being foldable over said lower portion.

3. An educational device according to claim 1, wherein said card includes a photograph of the particular drug.

4. An educational device according to claim 2, wherein said upper portion includes an opening for viewing an area of said lower portion when said card is in a folded condition.

5. An educational device according to claim 3, wherein said photograph is located on an interior surface of a lower portion of said card.

6. An educational device according to claim 1, wherein said scent patch includes a sponge sealed in a film layer.

7. An educational device according to claim 6, wherein said sponge contains a simulated odor of the particular drug.

8. An educational device for training an individual to recognize a particular illegal narcotic or legal substance used illegally, said device comprising:

a card, a scent patch on said card containing a simulated smell of a particular drug, a photograph on said card of the particular drug, and indicia on said card describing the particular drug.

9. An educational device according to claim 8, wherein said scent patch includes a sponge sealed in a film layer.

10. An educational device according to claim 8, wherein an upper portion of said card includes an opening for viewing said photograph when said upper portion is folded over a lower portion of said card.

11. An educational device according to claim 8, wherein said indicia describes the dangers and the affect on individuals of the particular drug.

12. An educational device according to claim 10, wherein said upper portion of said card includes a textured area simulative of the feel of the particular drug.

13. An educational device according to claim 12, wherein said lower portion of said card includes another textured area simulative of the feel of the particular drug.

14. An educational device for training an individual to recognize a particular illegal narcotic or legal substance used illegally, said device comprising:

a card identifying a particular drug, and a scent patch mounted on said card, said scent patch including a simulated odor of the particular drug identified by said card, said scent patch being sealed for release of said simulated odor upon breaking the integrity of said patch.

15. An educational device according to claim 14, wherein said card includes a photograph of the particular drug.

16. An educational device according to claim 14, wherein said card includes at least one textured area simulative of the feel of the particular drug.

17. An educational device according to claim 14, wherein said card is foldable along a central dividing line into an upper portion and a lower portion.

18. An educational device according to claim 15, wherein an upper portion of said card includes an opening for viewing said photograph when said upper portion is folded over a lower portion of said card.

19. An educational device according to claim 14, wherein said scent patch includes a sponge sealed in a film layer.

20. An educational device according to claim 17, wherein said upper portion has substantially a same height as said lower portion.

* * * * *